(12) United States Patent
Chen et al.

(10) Patent No.: US 9,531,945 B2
(45) Date of Patent: Dec. 27, 2016

(54) IMAGE CAPTURING DEVICE WITH AN AUTO-FOCUSING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jau-Yu Chen, Taipei (TW); Hsing-Hung Chen, Yilan County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/738,054

(22) Filed: Jun. 12, 2015

(65) Prior Publication Data

US 2016/0065833 A1    Mar. 3, 2016

(30) Foreign Application Priority Data

Sep. 1, 2014 (CN) .......................... 2014 1 0440581

(51) Int. Cl.
*H04N 5/232* (2006.01)
*H04N 5/225* (2006.01)

(52) U.S. Cl.
CPC .......... *H04N 5/23212* (2013.01); *H04N 5/225* (2013.01); *H04N 5/2258* (2013.01); *H04N 5/232* (2013.01)

(58) Field of Classification Search
CPC ... H04N 5/232; H04N 5/23212; H04N 5/2258
See application file for complete search history.

(56) References Cited

U.S. PATENT DOCUMENTS

| | | | |
|---|---|---|---|
| 2011/0150446 A1* | 6/2011 | Song ...................... | G03B 13/32 396/90 |
| 2011/0234767 A1* | 9/2011 | Tokiwa .............. | H04N 13/0217 348/47 |
| 2012/0147150 A1* | 6/2012 | Kojima .................. | G01C 3/085 348/50 |
| 2012/0154584 A1* | 6/2012 | Omer ...................... | G06T 5/008 348/144 |
| 2012/0154647 A1* | 6/2012 | Endo .................. | H04N 13/0239 348/262 |
| 2012/0327195 A1* | 12/2012 | Cheng ................ | H04N 5/23212 348/47 |

* cited by examiner

*Primary Examiner* — Abdelaaziz Tissire
(74) *Attorney, Agent, or Firm* — Li & Cai Intellectual Property (USA) Office

(57) ABSTRACT

An image capturing device includes a first image capturing module, a second image capturing module and a focusing and image processing module. The first image capturing module includes a plurality of first phase focusing detectors, and the field of view of the second image capturing module is smaller than the field of view of the first image capturing module. The plurality of the first phase focusing detectors are used for generating a plurality of first sets of optical sensing signals. When one of the plurality of the first sets of optical sensing signals are selected by the focusing and image processing module to provide a first focal signal according to the selected first set of optical sensing signal, the first image capturing module and the second image capturing module adjust respective focal distances according to the first focal signal.

8 Claims, 5 Drawing Sheets

IMAGE CAPTURING DEVICE WITH AN AUTO-FOCUSING METHOD THEREOF

BACKGROUND

1. Technical Field

The present invention generally relates to an image capturing device and an auto-focusing method thereof and, more particularly, to an image capturing device of a camera with a plurality of different fields of view and an auto-focusing method thereof.

2. Description of Related Art

With the development of focusing technologies, camera focusing has evolved from manual-focusing to auto-focusing. Generally, auto-focusing of a conventional digital camera includes contrast detection focusing and phase detection focusing. For contrast detection focusing, a highest contrast value is selected from a plurality of contrast values of images taken by a camera at different focal distances so as to achieve auto-focusing by determining the focal distance corresponding to the highest contrast value as an optimal focal distance of the camera.

On the other hand, for phase detection focusing, a light beam is split by a phase focusing detector into two light beams to be projected respectively onto two optical sensor units of the phase focusing detector to obtain a set of optical sensing signals to achieve auto-focusing by deciding the focal distance and the focusing direction according to phase difference information based on the optical sensing signals.

Since contrast detection focusing relies on contrast variations of images taken by a camera at different focal distances to determine the optimal focal distance, the camera has to compare the contrast values of the images during focusing so as to determine the optimal focal distance for the camera. Accordingly, compared to the camera using phase detection focusing, it takes longer time for the camera using contrast detection focusing to complete focusing.

It should be noted that the camera using phase detection focusing may cause distortion of images when there are provided too many phase focusing detectors in the camera because the optical sensor units of the phase focusing detectors are not suitable for use in generating pixels of images.

SUMMARY

One embodiment of the present invention provides an image capturing device. The image capturing device includes a first image capturing module, a second image capturing module and a focusing and image processing module. The first image capturing module includes a first lens module, a first image sensor and a first focusing device. The first image sensor is disposed correspondingly to the first lens module and includes a plurality of first phase focusing detectors and a plurality of first image sensing pixels to respectively provide a plurality of first sets of optical sensing signals and a first image. The first focusing device is connected to the first lens module so as to adjust a position of the first lens module. The second image capturing module includes a second lens module, a second image sensor and a second focusing device. A field of view of the second lens module is smaller than a field of view of the first lens module. The second image sensor is disposed correspondingly to the second lens module, and includes a plurality of second phase focusing detectors and a plurality of second image sensing pixels to respectively provide a plurality of second sets of optical sensing signals and a second image. The second focusing device is connected to the second lens module so as to adjust a position of the second lens module. The focusing and image processing module is electrically connected to the first image capturing module and the second image capturing module so as to select one of the plurality of first sets of optical sensing signals to correspondingly provide a first focal signal to the first focusing device and the second focusing device. The first focusing device and the second focusing device adjust respective positions of the first lens module and the second lens module according to the first focal signal. Otherwise, the focusing and image processing module selects one of a plurality of second sets of optical sensing signals to correspondingly provide a second focal signal to the first focusing device and the second focusing device. The first focusing device and the second focusing device adjust respectively the positions of the first lens module and the second lens module according to the second focal signal.

One embodiment of the present invention further provides an auto-focusing method for use with an image capturing device. The auto-focusing method comprises steps herein. A plurality of first phase focusing detectors provide a plurality of first sets of optical sensing signals. The focusing and image processing module selects one of the plurality of first sets of optical sensing signals to provide a first focal signal. The first image capturing module and the second image capturing module adjust respective focal distances according to the first focal signal.

To sum up the above, one embodiment of the present invention provides an image capturing device with image capturing modules with a plurality of fields of view and an auto-focusing method thereof. Therefore, when the focusing and image processing module selects one set of the optical sensing signals, the focusing and image processing module processes the selected one set of the optical sensing signals to correspondingly provide a focal signal. Accordingly, the plurality of image capturing modules can adjust respective focal distances according to the focal signal to complete auto-focusing.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," etc., may be used to describe various components, such components must not be limited to the above terms. The above terms are used only to distinguish one component from another. For example, a second component may be referred to as a first component within the scope of the present invention, and similarly, the first component may be referred to as the second component. As used herein, the term "and/or" includes any and all combinations of one or more of the associated listed items.

[Embodiment of an Image Capturing Device]

Figure 1:
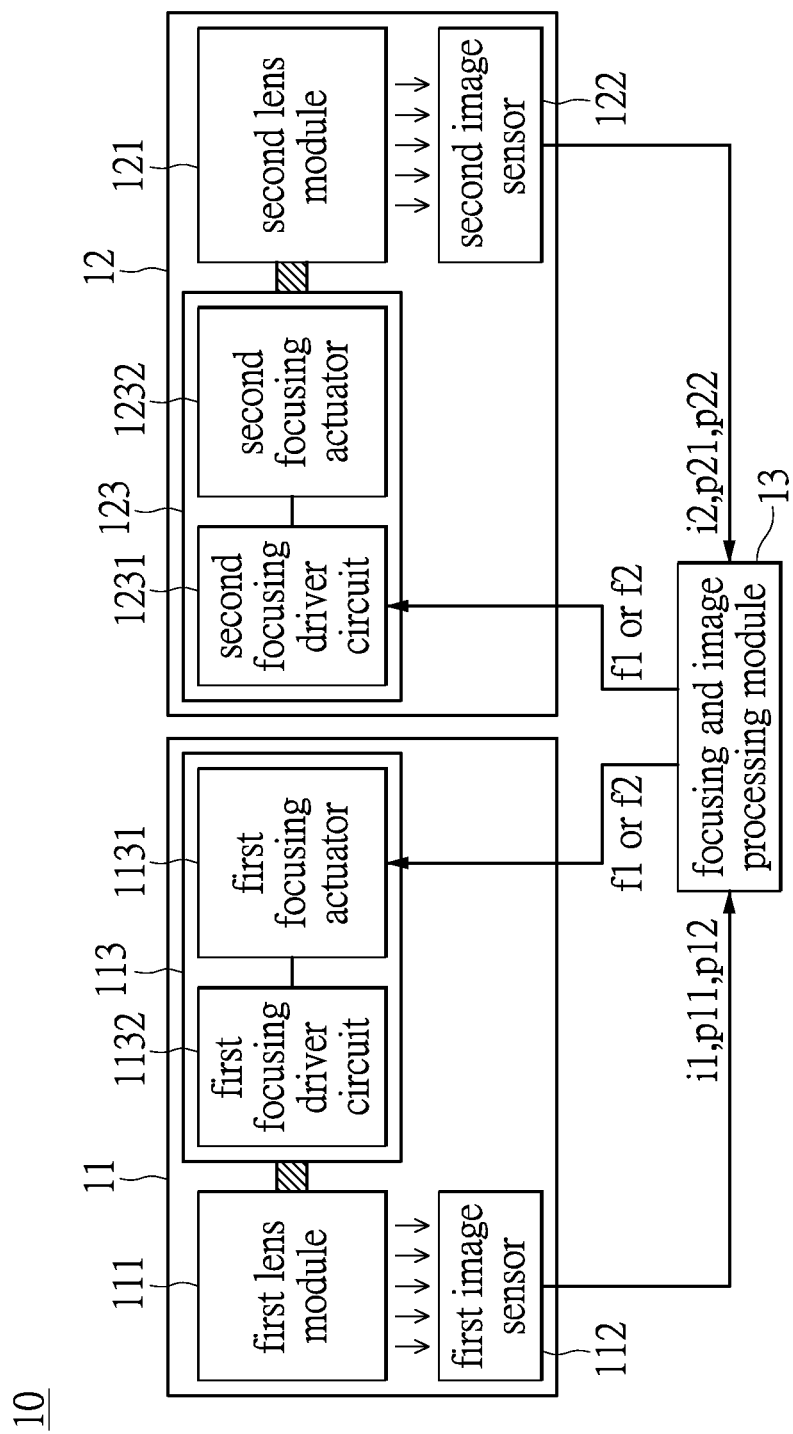
FIG. 1 is a block diagram of an image capturing device according to one embodiment of the present invention.

Please refer to FIG. 1, which is a block diagram of an image capturing device according to one embodiment of the present invention. As shown in FIG. 1, the image capturing device 10 includes a first image capturing module 11, a second image capturing module 12 and a focusing and image processing module 13. The focusing and image processing module 13 is electrically connected to the first image capturing module 11 and the second image capturing module 12. Each of the first image capturing module 11 and the second image capturing module 12 respectively includes a plurality of image sensing pixels and a plurality of phase focusing detectors. The plurality of image sensing pixels provide a plurality of sensed signals according to the scene, and the plurality of sensed signals construct a first image i1 and a second image i2. Each of the phase focusing detectors of the first image capturing module 11 and the second image capturing module 12 includes two optical sensor units to provide a first optical sensing signal p11, a second optical sensing signal p12, a third optical sensing signal p21 and a fourth optical sensing signal p22 according to the scene, respectively. The first optical sensing signal p11 and the second optical sensing signal p12 are the first set of optical sensing signals for generating the first phase difference signal, while the third optical sensing signal p21 and the fourth optical sensing signal p22 are the second set of optical sensing signals for generating the second phase difference signal. The focusing and image processing module 13 is used for receiving the first image i1 and a second image i2 generated by the first image capturing module 11 and the second image capturing module 12 to generate a fused image. The focusing and image processing module 13 uses one of the plurality of the first sets of optical sensing signals to obtain the first phase difference signal or uses one of the plurality of second sets of optical sensing signals to obtain the second phase difference signal so as to correspondingly provide a first focal signal f1 or a second focal signal f2.

In one embodiment of the present invention, the field of view of the first image capturing module 11 is larger than the field of view of the second image capturing module 12. In other words, compared to the second image capturing module 12, the first image capturing module 11 is a wide-angle camera. The plurality of phase focusing detectors are disposed respectively in the first image sensor 112 of the first image capturing module 11 and in the second image sensor 122 of the second image capturing module 12. The focusing and image processing module 13 uses a set of optical sensing signals to obtain a corresponding phase difference signal and accordingly provide a focal signal. Therefore, the first image capturing module 11 and the second image capturing module 12 can be focused by using the same focal signal.

For example, the plurality of focusing detectors can be disposed in the first image sensor 112 and the second image sensor 122. When the user uses the image capturing device 10 to shoot the scene, a spot of the scene is selected as a target to be focused at. Accordingly, a set of optical sensing signals provided from one of the phase focusing detectors in the first image capturing module 11 or the second image capturing module 12 corresponding to the spot. The focusing and image processing module 13 provides a phase difference signal based on the set of optical sensing signals and provides a focal signal accordingly, by which the first image capturing module 11 and the second image capturing module 12 are focused.

Furthermore, when one of the plurality of first sets of optical sensing signals are selected, the focusing and image processing module 13 uses the first set of optical sensing signals to provide a first phase difference signal and provide a first focal signal f1 accordingly so that the first image capturing module 11 and the second image capturing module 12 are focused by using the first focal signal f1. If one of the plurality of second sets of optical sensing signals are selected, the focusing and image processing module 13 uses the second set of optical sensing signals to provide a second phase difference signal and provide a second focal signal f2 accordingly so that the first image capturing module 11 and the second image capturing module 12 are focused by using the second focal signal f2.

It should be noted that, when the contrast value of the first image i1 obtained by the first image capturing module 11 after being focused by using the second focal signal f2 within a focal region does not reach a certain threshold value or is not a maximal contrast value, the first image capturing module 11 may alternatively switch to contrast detection focusing to obtain an optimal focal distance. When the contrast value of the second image i2 obtained by the second image capturing module 12 after being focused by using the first focal signal f1 within a focal region does not reach a certain threshold value or is not a maximal contrast value, the second image capturing module 12 may alternatively switch to contrast detection focusing to obtain an optimal focal distance. On the other hand, the focusing and image processing module 13 can be a digital signal processing circuit configured using a plurality of transistors or implemented using a micro-controller with suitable firmware, or a software module realized by software supported by a processor. However, the embodiment of the present invention is not limited to the above.

Next, the first image capturing module 11 will be described in detail. The first image capturing module 11 includes a first lens module 111, a first image sensor 112 and a first focusing device 113. The first image sensor 112 is disposed corresponding to the first lens module 111, and is electrically connected to the focusing and image processing module 13. The first focusing device 113 is connected to the first lens module 111, and is electrically connected to the focusing and image processing module 13.

In the present embodiment, the first lens module 111 is a lens set for imaging the scene to be shot on the first image sensor 112. The first image sensor 112 includes the plurality of image sensing pixels and the plurality of first phase focusing detectors, for example, complementary metal-oxide-semiconductor (CMOS) sensors.

The first focusing device 113 includes a first focusing driver circuit 1131 and a first focusing actuator 1132. The first focusing driver circuit 1131 is electrically connected to the focusing and image processing module 13. The first focusing driver circuit 1131 receives the first focal signal f1 or the second focal signal f2 to drive the first focusing actuator 1132 and adjust the position of the first lens module 111 to change the focal distance of the first image capturing module 11. The first focusing actuator 1132 may be, for example, a voice coil motor (VCM), to which the present invention is not limited.

Then, the second image capturing module 12 will be described in detail. The second image capturing module 12 includes a second lens module 121, a second image sensor 122 and a second focusing device 123. The second image sensor 122 is disposed corresponding to the second lens module 121, and is electrically connected to the focusing and image processing module 13. The second focusing device 123 is connected to the second lens module 121, and is electrically connected to focusing and image processing module 13.

In the present embodiment, the second lens module 121 is a lens set for imaging the scene to be shot on the second image sensor 122. As previously stated, in the present embodiment, the focal distance of the second lens module 121 is larger than that of the first lens module 111. In other words, the field of view of the second lens module 121 is smaller than that of the first lens module 111. Moreover, the second image sensor 122 includes the plurality of image sensing pixels and the plurality of first phase focusing detectors, for example, complementary metal-oxide-semiconductor (CMOS) sensors.

The second focusing device 123 includes a second focusing driver circuit 1231 and a second focusing actuator 1232. The second focusing driver circuit 1231 is electrically connected to the focusing and image processing module 13. The second focusing driver circuit 1231 receives the first focal signal f1 or the second focal signal f2 to drive the second focusing actuator 1232 and adjust the position of the second lens module 121 to change the focal distance of the second image capturing module 12. The second focusing actuator 1232 may be, for example, a voice coil motor, to which the present invention is not limited.

It should be noted that the first focusing driver circuit 1131 and the second focusing driver circuit 1231 are, for example, transformer circuits including a plurality of transistors for supplying voltage or current to corresponding focusing actuators according to the first focal signal f1 or the second focal signal f2. The voltage transformer circuits are designed according to the types or precision demands of the actuators.

After the first image sensor 112 and the second image sensor 122 provide the first image i1 and the second image i2 to the focusing and image processing module 13, the focusing and image processing module 13 provides a fused image as a preview image according to the first image i1 and second image i2. If a focal region in the preview image is selected for focusing, a set of optical sensing signals provided by a phase focusing detector corresponding to the focal region will also be selected. In other words, the focusing and image processing module 13 selects one of the plurality of first sets of optical sensing signals or one of the plurality of second sets of optical sensing signals according to the focal region. Then, the focusing and image processing module 13 provides a phase difference signal according to the selected one of the plurality of first sets of optical sensing signals or the selected one of the plurality of second sets of optical sensing signals. The focusing and image processing module 13 provides a focal signal according to the provided phase difference signal so that the first image capturing module 11 and the second image capturing module 12 can be auto-focused by using the same focal signal (the first focal signal f1 or the second focal signal f2).

More particularly, if the focal region corresponds to one of the plurality of first phase focusing detectors of the first image sensor 112, a first set of optical sensing signals (i.e., a first optical sensing signal p11 and a second optical sensing signal p12) provided by one of the plurality of first phase focusing detectors will be selected by the focusing and image processing module 13. The focusing and image processing module 13 provides the first phase difference signal according to the selected first set of optical sensing signals. Then, the focusing and image processing module 13 provides the first focal signal f1 according to the first phase difference signal. The focusing and image processing module 13 transmits the provided first focal signal f1 to the first focusing driver circuit 1131 of the first focusing device 113 and to the second focusing driver circuit 1231 of the second focusing device 123. Then, the first focusing driver circuit 1131 drives the first focusing actuator 1132 to adjust the position of the first lens module 111 according to the first focal signal f1, while the second focusing driver circuit 1231 drives the second focusing actuator 1232 to adjust the position of the second lens module 121 according to the first focal signal f1. Accordingly, the focal distances of the first image capturing module 11 and the second image capturing module 12 are adjusted to complete auto-focusing.

On the contrary, if the focal region corresponds to one of the plurality of second phase focusing detectors of the second image sensor 122, a second set of optical sensing signals (i.e., a third optical sensing signal p21 and a fourth optical sensing signal p22) provided by the one of the plurality of second phase focusing detectors will be selected by the focusing and image processing module 13. The focusing and image processing module 13 provides the second phase difference signal according to the selected second set of optical sensing signals. Then, the focusing and image processing module 13 provides the second focal signal f2 according to the second phase difference signal. The focusing and image processing module 13 transmits the provided second focal signal f2 to the first focusing driver circuit 1131 of the first focusing device 113 and to the second focusing driver circuit 1231 of the second focusing device 123. Then, the first focusing driver circuit 1131 drives the first focusing actuator 1132 to adjust the position of the first lens module 111 according to the second focal signal f2, while the second focusing driver circuit 1231 drives the second focusing actuator 1232 to adjust the position of the second lens module 121 according to the second focal signal f2.

Accordingly, the focal distances of the first image capturing module 11 and the second image capturing module 12 are adjusted to complete auto-focusing.

Then, the focusing and image processing module 13 obtains an image of the scene shot after the first image capturing module 11 and the second image capturing module 12 are auto-focused.

Figure 2:
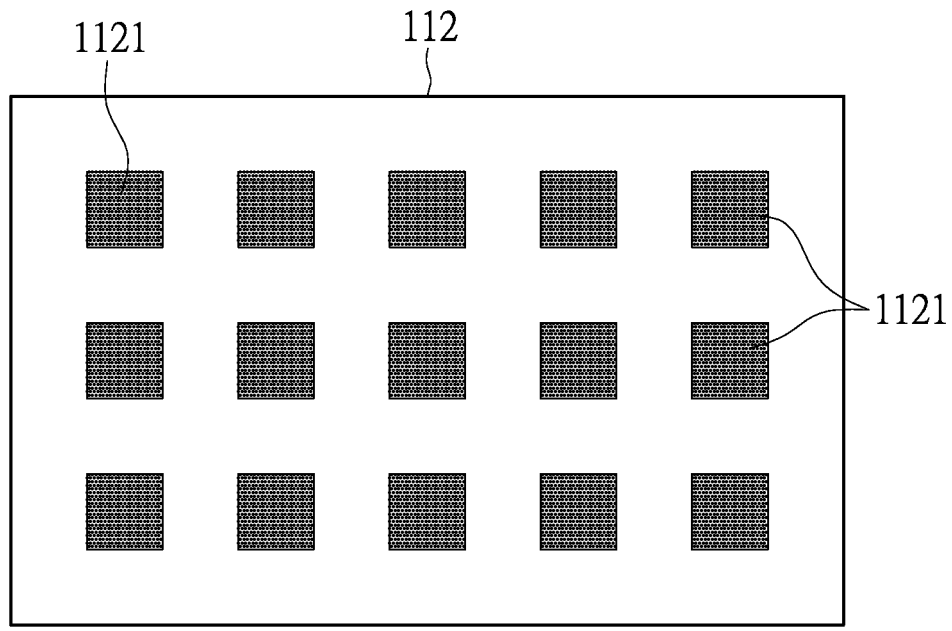
FIG. 2 is a schematic diagram of a first image sensor according to one embodiment of the present invention.
Figure 3:
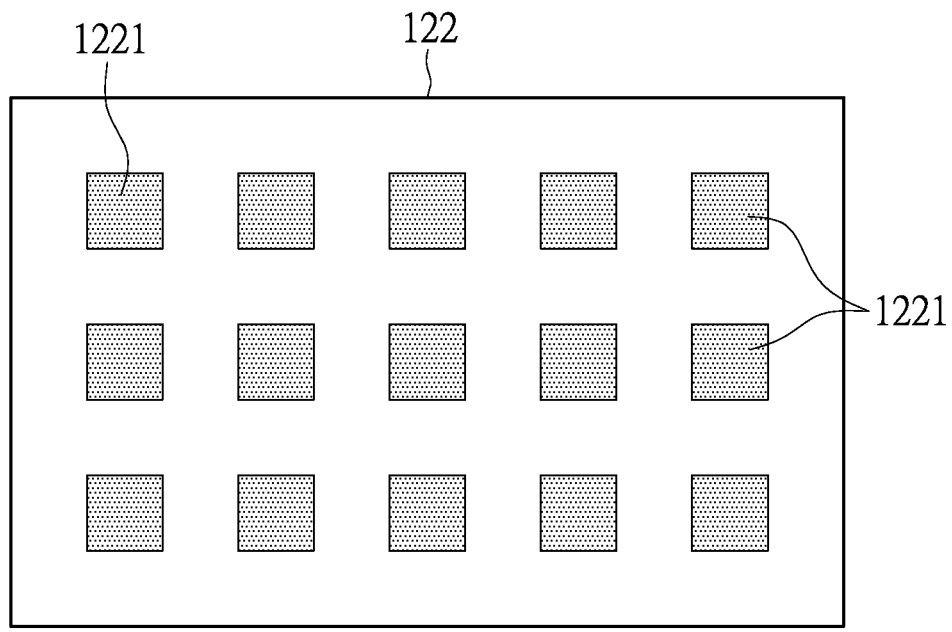
FIG. 3 is a schematic diagram of a second image sensor according to one embodiment of the present invention.

Please refer to FIG. 1, FIG. 2 and FIG. 3, wherein FIG. 2 is a schematic diagram of a first image sensor according to one embodiment of the present invention and FIG. 3 is a schematic diagram of a second image sensor according to one embodiment of the present invention. In the present embodiment, first phase focusing detectors 1121 of the first image sensor 112 and second phase focusing detectors 1221 of the second image sensor 122 are uniformly distributed among a plurality of image sensing pixels (not shown).

Next, a plurality of examples will be provided to describe the usage of the image capturing device 10 according to one embodiment of the present invention.

Figure 4:
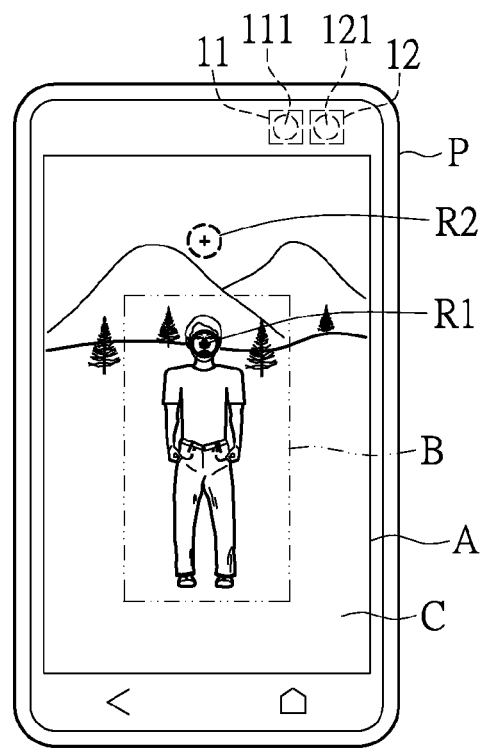
FIG. 4 shows a usage of an image capturing device according to one embodiment of the present invention.

Please refer to FIG. 1 to FIG. 4, wherein FIG. 4 shows a usage of an image capturing device according to one embodiment of the present invention. As shown in FIG. 4, the image capturing device 10 according to one embodiment of the present invention can be implemented on a smart phone P. More particularly, the first image capturing module 11 and the second image capturing module 12 can be installed on the top-right corner of the smart phone P. The first lens module 111 and the second lens module 121 are partially exposed on the smart phone P to capture images of the scene.

After the user enters an application (APP) of a camera, the scene to be shot is imaged by the first lens module 111 and the second lens module 121 on the first image sensor 112 and the second image sensor 122, respectively. Then, each of the first image sensor 112 and the second image sensor 122 correspondingly provides a first image i1, a plurality of first sets of optical sensing signals, a second image i2, and a plurality of second sets of optical sensing signals. Next, the focusing and image processing module 13 provides a preview image on the display of the smart phone P according to the first image i1 and the second image i2. The focusing and image processing module 13 further obtains a first focal signal f1 according to one of the plurality of first sets of optical sensing signals or a second focal signal f2 according to one of the plurality of second sets of optical sensing signals.

Furthermore, as shown in FIG. 4, the whole image selected by the frame A corresponds to the scene shot by the first lens module 111, and the image selected by the frame B corresponds to an overlapped region of the fields of view of the first lens module 111 and the second lens module 121 (i.e., the same portion of the scene shot by the first lens module 111 and the second lens module 121). Furthermore, the region (frame C) acquired by subtracting the image selected by the frame B from the whole image selected by the frame A corresponds to some of the plurality of first phase focusing detectors 1121 of the first image sensor 112. The image selected by the frame B corresponds to all the second phase focusing detectors 1221 of the second image sensor 122 and the plurality of first phase focusing detectors 1121 except the plurality of phase focusing detectors 1121 corresponding to the frame C.

For the preview image displayed on the smart phone P, if the user uses his/her finger or a touch pen to touch the focal region R1 (within the selected image in the frame B), a second set of optical sensing signals correspondingly provided by one of the plurality of second phase focusing detectors 1221 in the overlapped region of the fields of view or a first set of optical sensing signals correspondingly provided by one of the second phase focusing detectors 1221 will be selected correspondingly by the focusing and image processing module 13. The selected one of the second phase focusing detectors 1221 or the first phase focusing detectors 1121 corresponds to the focal region R1 within the image selected by the frame B.

Furthermore, if one of the second sets of optical sensing signals (i.e., a third optical sensing signal p21 and a fourth optical sensing signal p22) are selected, the focusing and image processing module 13 processes the selected one of the second sets of optical sensing signals to correspondingly provide a second focal signal f2. Next, the focusing and image processing module 13 transmits the second focal signal f2 to the first focusing driver circuit 1131 and the second focusing driver circuit 1231. The first focusing driver circuit 1131 drives the first focusing actuator 1132 according to the second focal signal f2 to correspondingly adjust the position of the first lens module 111, while the second focusing driver circuit 1231 drives the second focusing actuator 1232 according to second focal signal f2 to correspondingly adjust the position of the second lens module 121 to adjust the focal distances of the first image capturing module 11 and the second image capturing module 12.

On the other hand, if one of the first sets of optical sensing signals (i.e., a first optical sensing signal p11 and a second optical sensing signal p12) are selected, the focusing and image processing module 13 processes the selected one of the first sets of optical sensing signals to correspondingly provide a first focal signal f1. Next, the focusing and image processing module 13 transmits the first focal signal f1 to the first focusing driver circuit 1131 and the second focusing driver circuit 1231. The first focusing driver circuit 1131 drives the first focusing actuator 1132 according to the first focal signal f1 to correspondingly adjust the position of the first lens module 111, while the second focusing driver circuit 1231 drives the second focusing actuator 1232 according to the first focal signal f1 to correspondingly adjust the position of the second lens module 121 to adjust the focal distances of the first image capturing module 11 and the second image capturing module 12.

After auto-focusing, the first image sensor 112 provides a first image i1 corresponding to the focal distance, and the second image sensor 122 provides a second image i2 corresponding to the focal distance. The image processing module 13 fuses the first image i1 and the second image i2 corresponding to the focal distances to obtain a fused image. Simply put, since the focal region R1 in a preview image is where the fields of view of the first lens module 111 and the second lens module 121 overlap (i.e., the image selected by the frame B), one of the sets of optical sensing signals provided by a second phase focusing detector 1221 or a first phase focusing detector 1121 corresponding to the overlapped fields of view will be selected according to the position of the focal region R1. The focusing and image processing module 13 can provide a focal signal according to the set of optical sensing signals so that the fused image obtained after auto-focusing exhibits clearer images.

On the other hand, if the user uses his/her finger or a touch pen to touch the focal region R2 (within the selected image in the frame C), a first set of optical sensing signals correspondingly provided by one of the plurality of first phase focusing detectors 1121 in the non-overlapped region of the fields of view will be selected. The selected one of the first phase focusing detector 1121 corresponds to the focal region R2 within the image selected by the frame C. The focusing and image processing module 13 processes the selected one of the first sets of optical sensing signals to correspondingly provide a first focal signal f1. Next, the focusing and image processing module 13 transmits the first focal signal f1 to the first focusing driver circuit 1131 and the second focusing driver circuit 1231. The first focusing driver circuit 1131 drives the first focusing actuator 1132 according to the first focal signal f1 to correspondingly adjust the position of the first lens module 111, while the second focusing driver circuit 1231 drives the second focusing actuator 1232 according to the first focal signal f1 to correspondingly adjust the position of the second lens module 121 to adjust the focal distances of the first image capturing module 11 and the second image capturing module 12. After auto-focusing, the first image sensor 112 provides a first image i1 corresponding to the focal distance, and the second image sensor 122 provides a second image i2 corresponding to the focal distance. The image processing module 13 fuses the first image i1 and the second image i2 corresponding to focal distances to acquire a fused image.

Simply put, since the focal region R2 in a preview image is located in the non-overlapped region of the fields of view of the first lens module 111 and the second lens module 121, the image processing module 13 selects the first set of optical sensing signals provided by a first phase focusing detector 1121 corresponding to the non-overlapped region of the fields of view according to the position of the focal region R2. Then, the image processing module 13 provides a first focal signal f1 according to the selected first set of optical sensing signals. The first focusing device 113 correspondingly adjusts the position of the first lens module 111 based on the first focal signal f1 to provide a first image i1 with high image quality. On the other hand, the second focusing device 123 correspondingly adjusts the position of the second lens module 121 based on the first focal signal f1 to provide a second image i2 with high image quality.

It should be noted that the image capturing device 10 in one embodiment of the present invention can be used not only in smart phones but also in digital cameras or other image capturing devices. The embodiment as shown in FIG. 4 is only exemplary to describe the usage of the image capturing device 10, which the present invention is not limited to.

It should also be noted that, for the focal region R1 during the focusing process of the image capturing device 10, assuming that the first focusing device 113 of the first image capturing module 11 adjusts the position of the first lens module 111 according to the first focal signal f1 and the second focusing device 123 of the second image capturing module 12 adjusts the position of the second lens module 121 according to the first focal signal f1, the focusing and image processing module 13 further determines whether the contrast value of the second image i2 acquired within the focal region corresponding to a position exceeds a certain threshold value or is a maximal contrast value after the second lens module 121 is moved to the corresponding position.

If the contrast value of the second image i2 acquired within the focal region does not exceed a certain threshold value or is not a maximal contrast value, the focusing and image processing module 13 drives the second focusing device 123 to adjust the position of the second lens module 121 to another position. In other words, the focusing and image processing module 13 provides a third focal signal (not shown) to the second focusing driver circuit 1231 so that the second focusing driver circuit 1231 drives the second focusing actuator 1232 to adjust the position of the second lens module 121 again according to the third focal signal to acquire a second image i2 with a contrast value within the focal region exceeding a certain threshold value or a second image i2 with a maximal contrast value.

On the contrary, if the contrast value of the second image i2 acquired within the focal region exceeds a certain threshold value or is a maximal contrast value, the focusing and image processing module 13 will not drive the second focusing device 123 to change the position of the second lens module 121 but keep the present position of the second lens module 121 instead.

Similarly, for the focal region R1 during the focusing process, assuming that the first focusing device 113 of the first image capturing module 11 adjusts the position of the first lens module 111 according to the second focal signal f2 and the second focusing device 123 of the second image capturing module 12 adjusts the position of the second lens module 121 according to the second focal signal f2, the focusing and image processing module 13 further determines whether the contrast value of the first image i1 acquired within the focal region corresponding to a position exceeds a certain threshold value or is a maximal contrast value after the first lens module 111 is moved to the corresponding position.

If the contrast value of the first image i1 acquired within the focal region does not exceed a certain threshold value or is not a maximal contrast value, the focusing and image processing module 13 drives the first focusing device 113 to adjust the position of the first lens module 111 to another position. In other words, the focusing and image processing module 13 provides a third focal signal (not shown) to the first focusing driver circuit 1131 so that the first focusing driver circuit 1131 drives the first focusing actuator 1132 to adjust the position of the first lens module 111 again according to the third focal signal to acquire a first image i1 with a contrast value within the focal region exceeding a certain threshold value or a first image i1 with a maximal contrast value.

On the contrary, if the contrast value of the first image i1 acquired within the focal region exceeds a certain threshold value or is a maximal contrast value, the focusing and image processing module 13 will not drive the first focusing device 113 to change the position of the first lens module 111 but keep the present position of the first lens module 111 instead.

Simply put, for the focal region R1, even if the first image capturing module 11 adjusts the position of the first lens module 111 according to the second focal signal f2 or the second image capturing module 12 adjusts the position of the second lens module 121 according to first focal signal f1, the focusing and image processing module 13 can assure that the fused image of the first image i1 and the second image i2 after focusing exhibits better image quality because the focusing and image processing module 13 determines whether the contrast value of the first image i1 or the second image i2 within the focal region exceeds a certain threshold value or is a maximal contrast value and whether to change the position of the first lens module 111 or the second lens module 121.

Furthermore, it should be noted that, in the present embodiment, the image capturing device 10 only includes a first image capturing module 11 and a second image capturing module 12. However, the present embodiment is not limited to the number of image capturing modules included in the image capturing device 10. In other words, the image capturing device 10 may further include a third to an $N^{th}$ image capturing modules. In other words, the image capturing device 10 may include at least two image capturing modules, and a plurality of lens modules with various fields of view in the image capturing modules. When one of the plurality of sets of optical sensing signals are selected, the focusing devices in the plurality of image capturing modules may adjust the positions of the plurality of lens modules according to the set of optical sensing signals to achieve auto-focusing. After auto-focusing, the focusing and image processing module 13 of the image capturing device 10 fuses a plurality of images provided by the plurality of image capturing modules to correspondingly provide a fused image with better quality. Please note that, the focusing and image processing module 13 drives the plurality of image capturing modules to switch to contrast detection focusing to acquire optimal focal distances to assure a fused image with high image quality if the contrast values of the plurality of images provided by the plurality of image capturing modules within the focal regions do not reach certain threshold values or are not maximal contrast values. It should be also noted that other details of the image capturing device including at least two image capturing modules have been disclosed in the previously presented embodiments as shown in FIG. 1 to FIG. 4 and will not be repeated herein.

In the following embodiments, those components that are the same or are in correspondence with the embodiment in FIG. 1 are rendered the same reference numeral regardless of the figure number, and redundant explanations are omitted.

[Another Embodiment of an Image Capturing Device]

Figure 5:
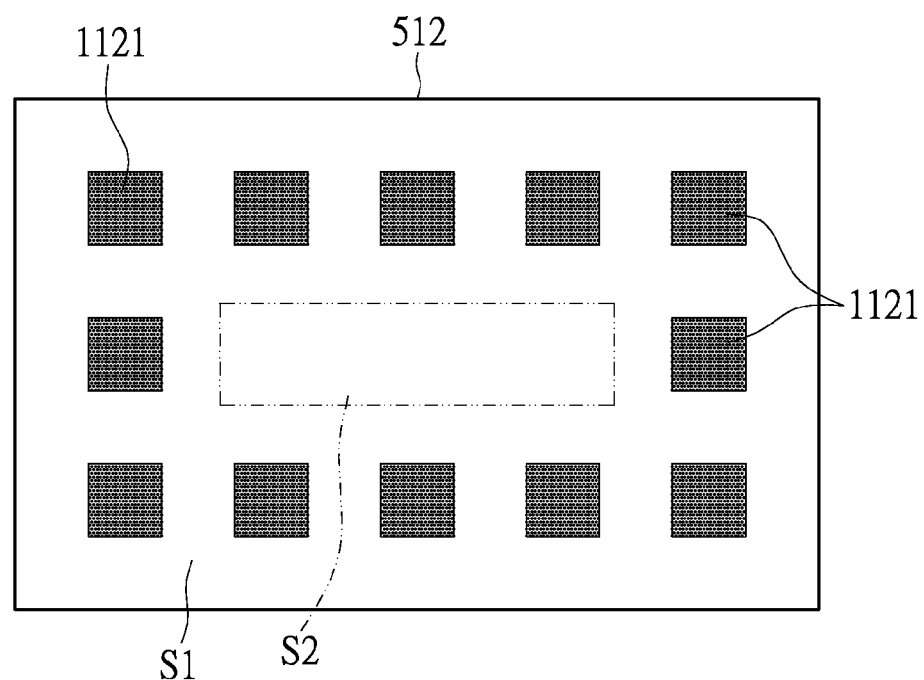
FIG. 5 is a schematic diagram of a first image sensor according to another embodiment of the present invention.

Please refer to FIG. 1, FIG. 3 and FIG. 5, wherein FIG. 5 is a schematic diagram of a first image sensor according to another embodiment of the present invention. As shown in FIG. 5, the first image sensor 512 includes less first phase focusing detectors 1121 than the first image sensor 112 of the embodiment in FIG. 2. The first phase focusing detectors 1121 are specifically distributed in the first image sensor 512.

More particularly, the distribution of the plurality of first phase focusing detectors 1121 in the first image sensor 512 relates to the non-overlapped region of the fields of view of the first lens module 111 and the second lens module 121. The non-overlapped region of the fields of view indicates the scene shot by the first lens module 111 excluding the region of the scene shot by both the first lens module 111 and the second lens module 121. As shown in FIG. 5, the plurality of first phase focusing detectors 1121 are only distributed in a first region S1 defined inside and near the boundary of the first image sensor 512, and none of the first phase focusing detectors 1121 is distributed in a second region S2 defined inside the boundary and located at the center of the first image sensor 512. The first region S1 corresponds to the non-overlapped region of the fields of view of the first lens module 111 and the second lens module 121, and the second region S2 corresponds to the overlapped region of the fields of view of the first lens module 111 and the second lens module 121.

In the present embodiment, since the field of view of the first lens module 111 in the first image capturing module 11 is larger than that of the second lens module 121 in the second image capturing module 12, a fused image with high quality corresponding to the overlapped region of the fields of view of the first lens module 111 and the second lens module 121 can be obtained by the focusing and image processing module 13 according to the set of optical sensing signals corresponding to the overlapped region of the fields of view provided by the second image sensor 122.

Simply put, the distribution of the first phase focusing detectors 1121 in the first image sensor 512 is related to the non-overlapped region of the fields of view of the first lens module 111 and the second lens module 121, and the distribution of the second phase focusing detectors 1221 in the second image sensor 122 is related to the overlapped region of the fields of view of the first lens module 111 and the second lens module 121. Accordingly, the number of phase focusing detectors can be reduced to lower the cost of the image capturing device 10 while keeping the high quality fused image with a limited number of phase focusing detectors installed.

In other embodiments, the non-overlapped region of the fields of view corresponding to the first lens module 111 and the second lens module 121 can be installed with more first phase focusing detectors 1121 in the first region 51 in the first image sensor 512. The overlapped region of the fields of view corresponding to the first lens module 111 and the second lens module 121 can be installed with less first phase focusing detectors 1121 in the second region S2 in the first image sensor 512. In other words, the distribution density of the first phase focusing detectors 1121 in the first region 51 is larger than the distribution density of the first phase focusing detectors 1121 in the second region S2.

[Embodiment of an Auto-Focusing Method]

Figure 6A:
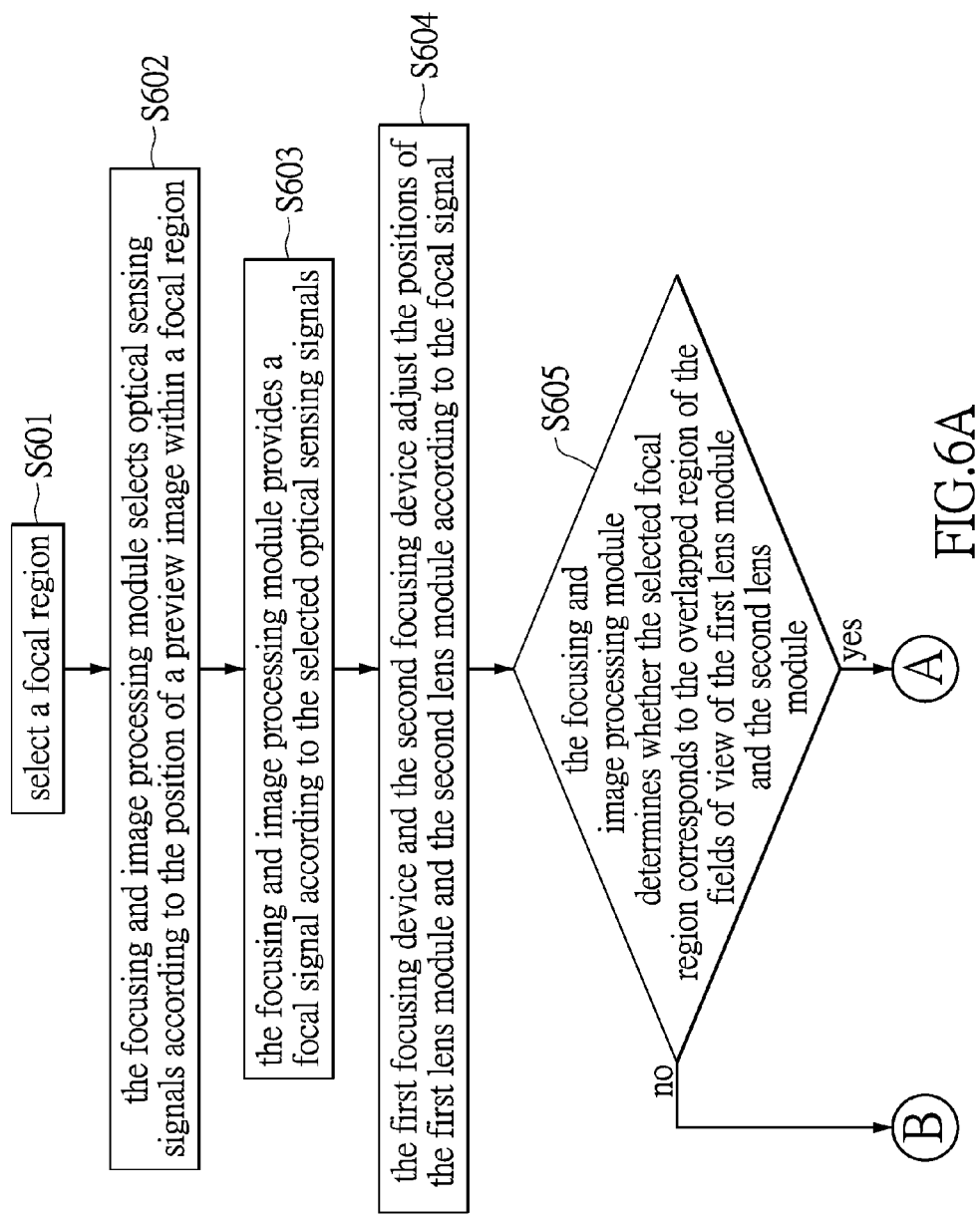
FIG. 6A and FIG. 6B are a flowchart of an auto-focusing method according to one embodiment of the present invention.
Figure 6B:
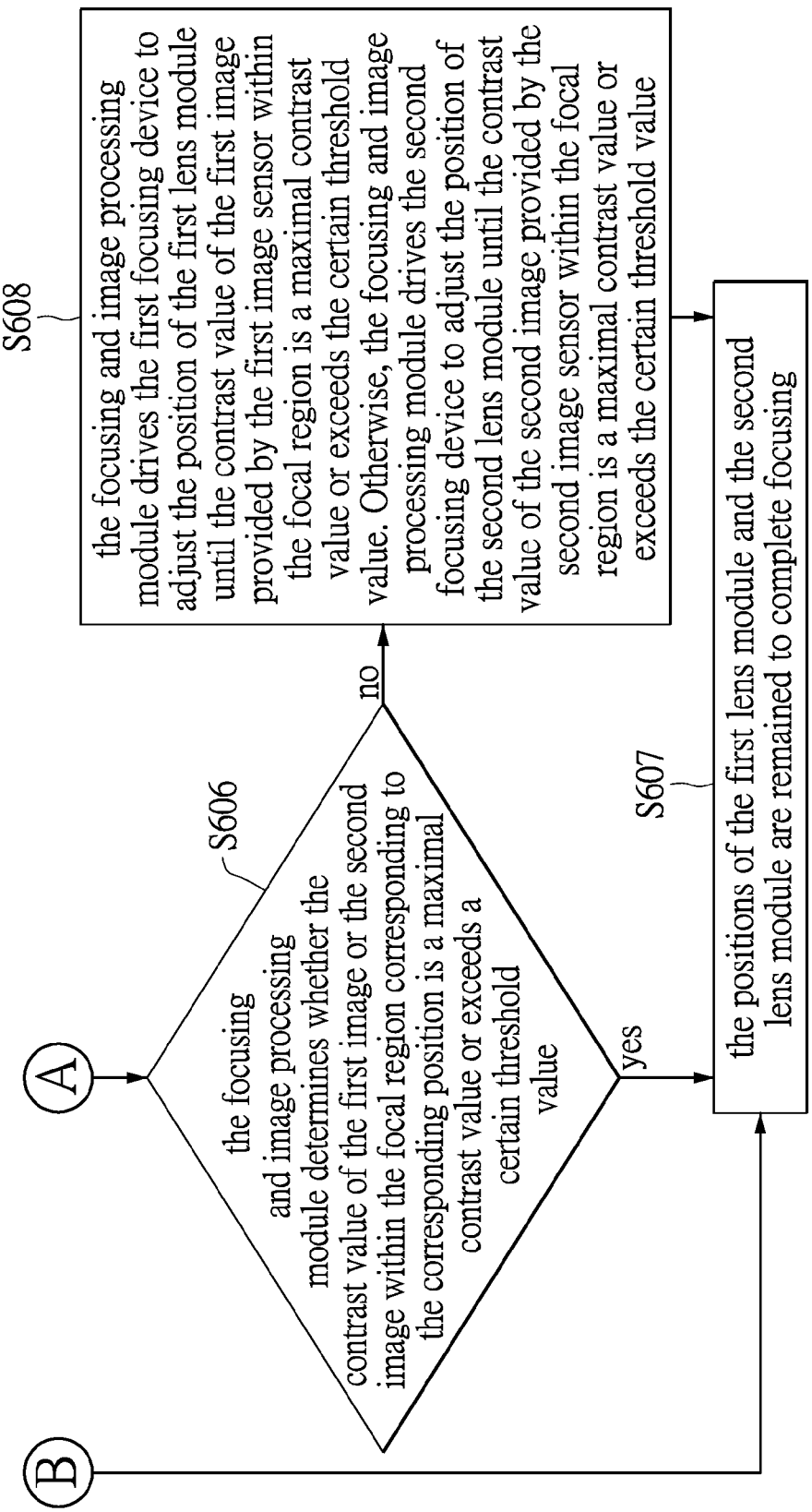

Please refer to FIG. 1 to FIG. 6B, wherein FIG. 6A and FIG. 6B are a flowchart of an auto-focusing method according to one embodiment of the present invention. The positioning method in FIG. 6A and FIG. 6B can be used with the image capturing device 10 in the present invention and the method includes steps herein.

In step S601, a focal region is selected.

In step S602, the focusing and image processing module 13 selects one of a plurality of sets of optical sensing signals according to the position of a preview image (prior to focusing) within a focal region. More particularly, according to the embodiments described above, the plurality of sets of optical sensing signals include a plurality of first sets of optical sensing signals and a plurality of second sets of optical sensing signals. The plurality of first sets of optical sensing signals are provided by a plurality of first phase focusing detectors 1121 of the first image capturing module 11 based on the scene that is shot. The plurality of second sets of optical sensing signals are provided by a plurality of second phase focusing detectors 1221 of the second image capturing module 12 based on the scene that is shot. In step S602, the focusing and image processing module 13 selects one of a plurality of first sets of optical sensing signals or one of a plurality of second sets of optical sensing signals according to the position of a preview image within the focal region.

In step S603, the focusing and image processing module 13 provides a focal signal f according to the selected one of the sets of optical sensing signals. In other words, the focusing and image processing module 13 provides a first phase difference signal according to the first set of optical sensing signals, and the focusing and image processing module 13 provides a first focal signal f1 according to the first phase difference signal. Then, the focusing and image processing module 13 transmits the first focal signal f1 to the first focusing device 113 and the second focusing device 123. Otherwise, the focusing and image processing module 13 provides a second phase difference signal according to the second set of optical sensing signals, and the focusing and image processing module 13 provides a second focal signal f2 according to the second phase difference signal. Then, the focusing and image processing module 13 transmits the second focal signal f2 to the first focusing device 113 and the second focusing device 123.

In step S604, the first focusing device 113 and the second focusing device 123 correspondingly adjust the positions of the first lens module 111 and the second lens module 121, respectively, according to the focal signal (the first focal signal f1 or the second focal signal f2). In other words, the first focusing device 113 and the second focusing device 123 adjust the positions of the first lens module 111 and the second lens module 121 to a corresponding position according to the first focal signal f1 or the second focal signal f2.

In step S605, after the first lens module 111 or the second lens module 121 are moved, the focusing and image processing module 13 further determines whether the selected focal region is the same for the first lens module 111 and the second lens module 121 to shoot the scene. In other words, the focusing and image processing module 13 further determines whether the selected focal region corresponds to the overlapped region of the fields of view of the first lens module 111 and the second lens module 121.

If, in step S605, the focusing and image processing module 13 determines that the selected focal region is the same for the first lens module 111 and the second lens module 121 to shoot the scene, the method proceeds to conduct step S606. Otherwise, the method proceeds to execute step S607.

In step S606, the focusing and image processing module 13 further determines whether the contrast value of the first image i1 or the second image i2 within the focal region corresponding to the corresponding position in step S605 is a maximal contrast value or exceeds a certain threshold value. If the focal signal is the first focal signal f1, step S606 determines the contrast value of the second image i2 within the focal region; if the focal signal is the second focal signal f2, step S606 determines the contrast value of the first image i1 within the focal region.

In step S607, the positions of the first lens module 111 and the second lens module 121 are kept to complete focusing.

If, in step S606, the focusing and image processing module 13 determines that the contrast value of the first image i1 or the second image i2 within the focal region is not a maximal contrast value or does not exceed the certain threshold value, the method proceeds to conduct step S608. Otherwise, the method proceeds to execute step S607 to complete focusing.

In step S608, the focusing and image processing module 13 drives the first focusing device 113 to adjust the position of the first lens module 111 (i.e., the focal distance of the first image capturing module 11) until the contrast value of the first image i1 provided by the first image sensor 112 within the focal region is a maximal contrast value or exceeds the certain threshold value. Otherwise, the focusing and image processing module 13 drives the second focusing device 123 to adjust the position of the second lens module 121 (i.e., the focal distance of the second image capturing module 12) until the contrast value of the second image i2 provided by the second image sensor 122 within the focal region is a maximal contrast value or exceeds the certain threshold value. If the focal signal is the first focal signal f1, the second focusing device 123 is driven in step S608. If the focal signal is the second focal signal f2, the first focusing device 113 is driven in step S608.

Moreover, it should be noted that the steps in the embodiment in FIG. 6A and FIG. 6B are only exemplifying, and the present invention is not limited to the order of the steps.

[Functions of the Embodiments]

As described above, the image capturing device and the auto-focusing method thereof according to the embodiments of the present invention use a plurality of image capturing modules with different fields of view installed on the image capturing device. When one of a plurality of sets of optical sensing signals are selected, the focusing and image processing module processes the selected one set of optical sensing signals to provide a corresponding phase difference signal. The focusing and image processing module provides a focal signal according to the phase difference signal so that a common focal signal can be used by various image capturing modules. Accordingly, the number of phase focusing detectors installed can be reduced to lower the cost while improving the image quality of a fused image after focusing.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An image capturing device, comprising:
a first image capturing module, comprising:
a first lens module;
a first image sensor disposed corresponding to said first lens module and comprising a plurality of first phase focusing detectors and a plurality of first image sensing pixels to provide respectively a plurality of first sets of optical sensing signals and a first image; and
a first focusing device connected to said first lens module for adjusting a position of said first lens module;
a second image capturing module, comprising:
a second lens module with a field of view smaller than a field of view of said first lens module;
a second image sensor disposed corresponding to said second lens module and comprising a plurality of second phase focusing detectors and a plurality of second image sensing pixels to provide respectively a plurality of second sets of optical sensing signals and a second image; and
a second focusing device connected to said second lens module for adjusting a position of said second lens module; and
a focusing and image processing module electrically connected to said first image capturing module and said second image capturing module;
wherein said first focusing device and said second focusing device adjust respectively a position of said first lens module and a position of said second lens module according to a first focal signal when one of said first sets of optical sensing signals are selected by said focusing and image processing module to correspondingly provide said first focal signal to said first focusing device and said second focusing device; and said first focusing device and said second focusing device adjust respectively said position of said first lens module and said position of said second lens module according to a second focal signal when one of said second sets of optical sensing signals are selected by said focusing and image processing module to correspondingly provide said second focal signal to said first focusing device and said second focusing device;
wherein said first phase focusing detectors are distributed in a first region of said first image capturing module, and said first region corresponds to a non-overlapped region of said fields of view of said first image capturing module and said second image capturing module.

2. The image capturing device of claim 1, wherein a distribution density of said first phase focusing detectors in the first region of said first image capturing module is higher than a distribution density of said first phase focusing detectors in a second region of said first image capturing module, wherein said first region corresponds to a non-overlapped region of said fields of view of said first image capturing module and said second image capturing module, and said second region corresponds to an overlapped region of said fields of view of said first image capturing module and said second image capturing module.

3. The image capturing device of claim 1, wherein said focusing and image processing module decides whether a contrast value of said second image being focused within a focal region is a maximal contrast value or exceeds a threshold value when said focusing and image processing module provides said first focal signal according to said one of said first sets of optical sensing signals, and drives said second focusing device to move said second lens module so that said contrast value of said second image being focused within said focal region is said maximal contrast value or exceeds said threshold value when said contrast value of said second image being focused within said focal region is not said maximal contrast value or does not exceed said threshold value, wherein one of said first phase focusing detectors that provides said selected one of said first sets of optical sensing signals corresponds to an overlapped region of said fields of view of said first image capturing module and said second image capturing module; wherein said focusing and image processing module decides whether said contrast value of said first image being focused within said focal region is said maximal contrast value or exceeds said threshold value when said focusing and image processing module provides said second focal signal according to said second sets of optical sensing signals, and drives said first focusing device to move said first lens module so that said contrast value of said first image being focused within said focal region is said maximal contrast value or exceeds said threshold value when said contrast value of said first image being focused within said focal region is not said maximal contrast value or does not exceed said threshold value, wherein one of said second phase focusing detectors that provides said selected one of said second sets of optical sensing signals corresponds to an overlapped region of said fields of view of said first image capturing module and said second image capturing module.

4. An auto-focusing method for use with an image capturing device, said image capturing device comprising a plurality of image capturing modules and a focusing and image processing module, said image capturing modules comprising a first image capturing module and a second image capturing module, a field of view of said first image capturing module being larger than a field of view of said second image capturing module, and said first image capturing module comprising a plurality of first phase focusing detectors, wherein said auto-focusing method comprises steps of:
providing a plurality of first sets of optical sensing signals from said first phase focusing detectors;
selecting one of said first sets of optical sensing signals by said focusing and image processing module to provide a first focal signal;
adjusting respective focal distances of said first image capturing module and said second image capturing module according to said first focal signal;
wherein said first phase focusing detectors are distributed in a first region of said first image capturing module, and said first region corresponds to a non-overlapped region of said fields of view of said first image capturing module and said second image capturing module.

5. The auto-focusing method of claim 4, wherein said second image capturing module comprises a plurality of second phase focusing detectors, said auto-focusing method further comprises steps of:
providing a plurality of second sets of optical sensing signals from said second phase focusing detectors;
selecting one of said second sets of optical sensing signals by said focusing and image processing module to provide a second focal signal; and
respectively adjusting said focal distances of said first image capturing module and said second image capturing module according to said second focal signal.

6. The auto-focusing method of claim 5, further comprising steps of:
deciding by said focusing and image processing module whether a contrast value of a second image being focused by said second image capturing module within a focal region is a maximal contrast value or exceeds a threshold value when one of said first sets of optical sensing signals are selected for focusing, wherein one of said first phase focusing detectors that provides said selected one of said first sets of optical sensing signals corresponds to an overlapped region of said fields of view of said first image capturing module and said second image capturing module; and
using contrast detection focusing by said focusing and image processing module to adjust said focal distance of said second image capturing module so that said contrast value in said second image in said focal region is said maximal contrast value or exceeds said threshold value when said contrast value of said second image in said focal region is not said maximal contrast value or does not exceed said threshold value.

7. The auto-focusing method of claim 6, further comprising steps of:
deciding by said focusing and image processing module whether a contrast value of a first image being focused by said first image capturing module within a focal region is a maximal contrast value or exceeds a threshold value when one of said second sets of optical sensing signals are selected for focusing, wherein one of said second phase focusing detectors that provides said selected one of said second sets of optical sensing signals corresponds to an overlapped region of said fields of view of said first image capturing module and said second image capturing module; and
using contrast detection focusing by said focusing and image processing module to adjust said focal distance of said first image capturing module so that said contrast value in said first image in said focal region is said maximal contrast value or exceeds said threshold value when said contrast value of said first image in said focal region is not said maximal contrast value or does not exceed said threshold value.

8. The auto-focusing method of claim 4, further comprising steps of:
deciding by said focusing and image processing module whether a contrast value of a second image being focused by said second image capturing module within a focal region is a maximal contrast value or exceeds a threshold value when one of said first sets of optical sensing signals are selected for focusing, wherein one of said first phase focusing detectors that provides said selected one of said first sets of optical sensing signals corresponds to an overlapped region of said fields of view of said first image capturing module and said second image capturing module; and using contrast detection focusing by said focusing and image processing module to adjust said focal distance of said second image capturing module so that said contrast value in said second image in said focal region is said maximal contrast value or exceeds said threshold value when said contrast value of said second image in said focal region is not said maximal contrast value or does not exceed said threshold value.

* * * * *